(12) United States Patent
Carter

(10) Patent No.: US 7,816,568 B2
(45) Date of Patent: Oct. 19, 2010

(54) DIRECT CATALYTIC CONVERSION OF CELLULOSE MATERIALS TO ETHANOL

(76) Inventor: Melvin Keith Carter, 2300 Sutter View La., Lincoln, CA (US) 95648

( * ) Notice: Subject to any disclaimer, the term of this patent is extended or adjusted under 35 U.S.C. 154(b) by 326 days.

(21) Appl. No.: 12/000,682

(22) Filed: Dec. 17, 2007

(65) Prior Publication Data

US 2009/0156868 A1 Jun. 18, 2009

(51) Int. Cl.
*C07C 29/09* (2006.01)
(52) U.S. Cl. .................. 568/877; 568/878; 568/890; 435/105; 435/165
(58) Field of Classification Search .................. 435/165, 435/105; 568/877, 878, 890
See application file for complete search history.

(56) References Cited

U.S. PATENT DOCUMENTS 6,660,506 B2 * 12/2003 Nguyen et al. .............. 435/165

* cited by examiner

*Primary Examiner*—Elvis O Price

(57) ABSTRACT

Catalytic reactions conducted during acid digestion of cellulose materials, including paper, a wide range of grasses including prairie grass, switch grass, pine wood sawdust, bagasse dried after sugar cane processing, cotton, waste cellulose products and starch materials, are taught for direct conversion to ethanol. The cellulose material is thoroughly wet in concentrated sulfuric acid in the presence of transition metal complexes possessing a degree of symmetry. Ethanol formed during the reaction can be removed by distillation affording a continuous process.

7 Claims, No Drawings

DIRECT CATALYTIC CONVERSION OF CELLULOSE MATERIALS TO ETHANOL

REFERENCES CITED

U.S. Patent Documents

| U.S. Pat. No. | Issue Date | Author | Comments |
|---|---|---|---|
| 7,198,925 | Apr. 3, 2007 | B. Foody | Steam and acid hydrolysis of ligno-cellulosics to xylose |
| 6,747,067 | Jun. 8, 2004 | L J Melnichuk, K Venita | Gasification of cellulose to carbon monoxide and hydrogen for formation of methanol and other products |
| 6,660,506 | Dec. 9, 2003 | Q A Nguyen, F A Keller, M P Tucker | Dilute acid hydrolysis with metal salts converting cellulose to sugars |
| 4,415,749 | Nov. 15, 1983 | D C Hargis, M Dubeck | Ethanol and methyl acetate in the vapor phase at 225° C. to 300° C. over zero valent Rh and Fe at 50 psig to 250 psig pressure |

BACKGROUND

1. Field of Invention

This invention relates to acid digestion and simultaneous catalytic chemical conversion of cellulose materials to ethanol at high yields in a single process step. Specifically, this application discloses efficient catalytic conversion of cellulose materials including prairie grass, switch grass, bagasse, wood fiber, wood sawdust, news paper, cotton, waste cellulose products and starch materials in an acid digestion solvent to ethanol employing catalysts based on transition metal complexes possessing a degree of symmetry as described herein.

2. Description of Prior Art

The chemical process industry has grown to maturity based on petroleum feed stocks, a non-renewable resource that may become unavailable in the next 100 years. This planet Earth fosters continual growth of abundant carbohydrate based plants including fruits, vegetables, starches, grain food sources, grasses, cotton, shrubs, trees and related natural waste materials. Grains, corn cobs, the support plant stalks and certain grasses are, in part, subject to bio-fermentation processes producing ethanol and related products at modest yields. These processes are slow, require significant nutrients for plant growth and convert some ten percent of the cellulose and related materials to ethanol. A major industry is blooming in ethanol production and this application teaches rapid, efficient catalytic conversion of essentially all cellulose and starch materials to ethanol for use as a fuel and a raw material in the chemical process industry.

A number of process paths have previously been taught for chemical conversion of cellulose and hemi-cellulose materials to ethanol. These processes include fermentation of grains, corn and corn cobs, dilute acid pre-treatment or acidic steam treatment of dried plant materials followed by fermentation of the resulting sugars, enzymatic digestion of cellulose to hemicelluloses and sugars for fermentation as well as gasification of wood chips to carbon monoxide and hydrogen (synthesis gas) to produce products by Fischer-Tropsch type processes. Gasification is expensive and requires some 300° C. to 600° C. in an inert gas environment, acidic steam treatment subjects bio-mass to pressure with temperatures up to 180° C., acid digestion or hydrolysis can be conducted at temperatures of 20° C. to 120° C. while fermentation may be operated in the 20° C. to 55° C. range. Ethanol has been made from ethylene dissolved in sulfuric acid, diluted and isolated by distillation. It has also been produced by heating ethylene with steam at 300° C. and 1000 to 4000 psi pressure using acid or acidic transition metal oxide catalysts. U.S. Pat. No. 4,415,749, issued Nov. 15, 1983, teaches a process for production of ethanol and methyl acetate in the vapor phase at 225° C. to 300° C. over zero valent Rh and Fe at 50 psig to 250 psig pressure. U.S. Pat. No. 6,747,067, issued Jun. 8, 2004, teaches gasification of cellulose to carbon monoxide and hydrogen for subsequent formation of methanol, ethanol and related products.

There are a number of dilute acid digestion or pre-treatment process disclosed for partial conversion of cellulose to sugars for subsequent formation of ethanol by fermentation. U.S. Pat. No. 6,660,506, issued Dec. 9, 2003, teaches dilute acid hydrolysis of cellulose, with metal salts, for partial conversion to sugars. U.S. Pat. No. 7,198,925, issued Apr. 3, 2007, teaches acidic steam pretreatment of bale quantities of cereal straw, stover or grass for hydrolysis of hemicellulose to xylose at 160° C. to 280° C.

The present application discloses use of low valent mono-metal, di-metal, tri-metal and/or poly-metal backbone or molecular string type transition metal catalysts, as described in this application, for direct production of high yields of ethanol from cellulose. Ethanol production occurs in both open and sealed reactors but product yields are higher for the sealed reactor process.

SUMMARY OF THE INVENTION

This invention describes chemical methods using selected members of transition metal catalysts possessing a high degree of symmetry in their lower valence states for conversion of cellulose and natural plant materials to ethanol. Lignin and lignin compounds may also be recovered as bi-products.

It is an object of this invention, therefore, to provide a catalytic process facilitating conversion of cellulose to alcohol in an acid digestion solvent. It is another object of this invention to catalytically convert cellulose materials to alcohol at normal solvent vapor pressure. It is still another object of this invention to catalytically convert plant cellulose and starch materials to ethanol at elevated temperature. Other objects of this invention will be apparent from the detailed description thereof which follows, and from the claims.

DETAILED DESCRIPTION OF THE INVENTION

A process for catalytic chemical conversion of cellulose materials comprising cereal straw, stover, prairie grass, switch grass, bagasse, cotton, wood fiber, wood sawdust, news paper, waste cellulose products and starch materials to ethanol and lignin bi-products is taught based on transition metal compounds, such as [vanadium]$_2$, [iron]$_2$ or [cobalt]$_2$ type compounds, for which the transition metals and directly attached atoms possess $C_{4v}$, $D_{4h}$ or $D_{2d}$ point group symmetry. These catalysts have been designed based on a formal theory of catalysis, and the catalysts have been produced, and tested to prove their activity. The theory of catalysis rests upon a requirement that a catalyst possess a single metal atom or a molecular string such that transitions from one molecular electronic configuration to another be barrier free so reactants may proceed freely to products as driven by thermodynamic considerations. Catalysts effective for chemical conversion of cellulose to ethanol can be made from mono-metal, di-metal, tri-metal and/or poly-metal backbone or molecular string type compounds of the transition metals comprising titanium, vanadium, chromium, manganese, iron, cobalt, nickel, copper, zirconium, niobium, molybdenum, ruthenium, rhodium, palladium, silver, hafnium, tantalum, tungsten, rhenium, osmium, iridium, platinum, gold or combinations thereof. These catalysts are typically made in the absence of oxygen so as to produce compounds wherein the oxidation state of the transition metal is low, typically monovalent, divalent or trivalent although zero valent metal catalysts may also be produced. Anions employed for these catalysts comprise fluoride, chloride, bromide, iodide, cyanide, isocyanate, thiocyanate, sulfate, phosphate, oxide, hydroxide, oxalate, acetate, organic chelating agents and/or more complex groups. Mixed transition metal compounds have also been found to be effective catalysts for chemical conversions.

These catalysts act on cellulose, hemi-celluloses, starches and essentially any available carbohydrate type compounds to generate free radicals in times believed to be the order of or less than that of a normal molecular vibration. This may be viewed as generation of free radical reactants in equilibrium such that the reaction indicated by the equation $(C_6H_{10}O_5)_x + xH_2O \rightarrow 2xCH_3CH_2OH + 2xCO_2$ may proceed Water provided in the acid solvent reaction sphere causes hydrolysis of the cellulose such that catalytic exposure to monomer, dimer or oligomer transition metal complexes produces ethanol and carbon dioxide. Thus, ethanol is the product of cellulose reactions and lignin bi-products are released during the process.

Sulfuric acid digestion of several cellulose materials has been shown to be complete when the acid solvent is present in a majority concentration. Catalytic conversion of the dissolved or hydrolyzed cellulose materials efficiently converts carbohydrate reactants to ethanol in a sealed reaction vessel without application of external pressure.

Catalyst Selection Considerations

A Concepts of Catalysis effort formed a basis for selecting molecular catalysts for specified chemical reactions through computational methods by means of the following six process steps. An acceptable chemical conversion mechanism, involving a single or pair of transition metal atoms, was established for the reactants (step 1). A specific transition metal, such as cobalt, was selected as a possible catalytic site as found in an M or M-M string (step 2), bonded with reactant molecules in essentially a $C_{4v}$, $D_{2d}$ or $D_{4h}$ point group symmetry configuration, and having a computed bonding energy to the associated reactants of $0 > E > -60$ kcal/mol (step 3). The first valence state for which the energy values were two-fold degenerate was 2+ in most cases although 1+ is possible (step 4). Cyanide, chloride and other anions may be chosen provided they are chemically compatible with the metal in formation of the catalyst (step 5). An inspection should also be conducted to establish compliance with the rule of 18 (or 32) to stabilize the catalyst; thus, compatible ligands may be added to complete the coordination shell (step 6). This same process may be applied for selection of a catalyst using any of the first, second or third row transition metals, however, only those with acceptable negative bonding energies can produce effective catalysts. The approximate relative bonding energy values may be computed using a semi-empirical algorithm or other means. Such a computational method indicated that any of the first row transition metal complexes may be anticipated to produce usable catalysts once the outer coordination shell had been completed with ligands. In general, preliminary energy values computed for transition metal carbohydrate complexes are indicated to produce useable catalysts once bonding ligands have been added.

Catalyst structures commonly including a pair of bonded transition metal atoms may require chelating ligands and/or bonding orbital structures that may be different for each metal. The following compounds comprise a limited selection of examples. For the first row transition metals vanadium catalysts comprise vanadium(II) oxide, $(VO)_2$, and $(VF_2)_2$ having V—V bonds and ethylenediamine (EDA) links the metals in $(VCl_2)_2EDA_2$, ethanol or other reactants may displace a CO and/or a THF in the compound $[V(THF)_4Cl_2][V(CO)_6]_2$ while $V_2(SO_4)_3$ may also be useful Chromium catalysts comprise $Cr(O_2CCH_3)_2(HO_2CCH_3)_2$, $Cr_2[CH_3(C_5H_3N)O]_4$, $(CrCl_2)_2 \cdot 2EDA$, $(CrBr_2)_2EDA_2$, $[Cr(OH)_2]_2EDA_2$ and $Cr_2(O_2CCH_3)_4(H_2O)_2$ where a reactant may displace waters of hydration. Manganese catalysts comprise $[Mn(diethyldithiocarbamate)]_n$, $(MnCl_2)_2EDA_2$, $K_2[Mn_2Cl_6(H_2O)_4]$ and $Mn_2(C_5H_8O_2)_4(H_2O)_2$. Iron catalysts comprise $(FeCl_2)_2EDA_2$, $(FeBr_2)_2EDA_2$ and $Fe_2(SO_4)_3$. Cobalt catalysts comprise $Co_2(C_6H_5O_2)_2(C_6H_6O_2)_2$, $Co_2(C_5H_8O_2)_4(H_2O)_2$, $Co(C_6H_5O_2)_2(C_6H_6O_2)_2$, $Co_2(C_6H_5O_2)_4$, $Ca_3[Co_2(CN)_{10}]13H_2O$, $[Co(CN)_2]_2K_3Cu(CN)_4$ and $Co_2(SO_4)_3$. Nickel catalysts comprise $Ni_2(C_6H_5N_3C_6H_5)$, $Ni_2Br_2(C_8H_6N_2)$ and $Ni_2S_2(C_2H_2C_6H_5)$. Copper catalysts comprise $[CuO_2CC_6H_5]_4$, $[CuO_2CCH_3]_4$, $(CuCl)_2(EtOH)_4$, $(CuCN)_2(EtOH)_4$ and $K_2Cu_4(\mu_2SC_6H_5)_6$.

Second and third row transition metals are organized in groups or pairs. Zirconium, hafnium, nobelium and tantalum comprise $(ZrCl_2)_2$, $(HfCl_2)_2$, $(HfF_2)^2$, $(NbCl_2)_2$, $(TaCl_2)_2$ and $(TaF_2)_2$. Molybdenum and tungsten catalysts comprise $[Mo(CO)_4Cl_2]_2$, $[W(CO)_4Cl_2]_2$, $[K_4MoCl_6]_2$, $[Mo(CN)_2]_2K_3Cu(CN)_4$, $[W(CN)_2]_2K_3Cu(CN)_4$, $[Mo(Cl)_2]_2K_3Cu(CN)_4$ and $[W(Cl)_2]_2K_3Cu(CN)_4$. Rhenium and technetium catalysts comprise $[Re(CO)_2Cl_2(PR_3)_3]_2$ and $[Tc(CO)_2Cl_2(PR_3)_3]_2$. Platinum, palladium, ruthenium, rhodium, osmium and iridium catalysts comprise $(PtF_2)_2$, $(PdF_2)_2$, $[RuCl_2]_2EDA_4$, $[RhCl_2]_2EDA_4$, $[Ru(C_8H_6N_2)_2Cl_2]_2$, $[Rh(C_8H_6N_2)_2Cl_2]_2$, $Ru_2(O_2CR)_4Cl$, $Rh_2(O_2CR)_4Cl$, $[PdCl_4(PBu_3)_2]_2$, $[PtCl_4(PBu_3)_2]_2$, $[OsCl_2]_2EDA_4$ and $[IrCl_2]_2EDA_4$. Silver and gold catalysts comprise $(AgCN)_2K_3Cu(CN)_4$ and $(AuCN)_2K_3Cu(CN)_4$.

A select number of single transition metal atom catalyst complexes containing four ligands each belong to the required point group symmetry. These catalysts comprise $M(II)(C_6H_5O_2)_2(C_6H_6O_2)_2$, $M(II)(p-C_6H_5O_2)_2$, $M(II)(C_6H_6NO)_2(C_6H_7NO)_2$ and $M(II)(O_2CCH_3)_2(HO_2CCH_3)_2$ plus possible solvation ligands where M represents titanium, vanadium, chromium, manganese, iron, cobalt, nickel, copper, zirconium, niobium, molybdenum, ruthenium, rhodium, palladium, silver, hafnium, tantalum, tungsten, rhenium, osmium, iridium, platinum or gold. In a limited number of complexes the transition metal atom may be monovalent or trivalent.

Description of Catalyst Preparation and Chemical Conversion

Catalyst preparation was conducted using nitrogen purging and/or nitrogen blanketing to minimize or eliminate air oxidation of the transition metal compounds during preparation.

Transition metal catalysts effective for conversion of carbohydrate materials can be produced by combining transition metal salts in their lowest standard oxidation states with other reactants. Thus, such transition metal catalysts can be made by partially reacting transition metal (I or II) chlorides, bromides, sulfates, cyanides or similar compounds with transition metal (I, II or III) compounds and chelates or by forming transition metal compounds in a reduced state by similar means where mono-, di-, tri- and/or poly-metal compounds result. Some examples follow.

Example 1

The $Co_2(C_6H_5O_2)_4$ catalyst was prepared in a nitrogen atmosphere by addition of 0.660 grams (6 mmol) of pyrocatechol dissolved in 3.5 mL of nitrogen purged water to 0.7138 grams (3 mmol) of cobalt (II) chloride hexahydrate dissolved in 3 mL of nitrogen purged water with mixing and addition of 2N sodium hydroxide drop wise to attain a pH of 7. An insoluble dark green to black solid product formed. The suspended catalyst was used as prepared.

Example 2

The $Co_2(SO_4)_3$ catalyst was prepared in a nitrogen atmosphere by addition of 0.804 grams (3 mmol) of sodium sulfate to 0.331 grams (2 mmol) of cobalt (III) chloride dispersed in 6 mL of nitrogen purged water with mixing. A soluble colored product solution formed. The dissolved catalyst was isolated for use.

Example 3

The $Cr_2(SO_4)_3$ catalyst was prepared in a nitrogen atmosphere by addition of 0.804 grams (3 mmol) of sodium sulfate to 0.317 grams (2 mmol) of cobalt (III) chloride dispersed in 5 mL of nitrogen purged water with mixing. A soluble colored product solution formed. The dissolved catalyst was isolated for use.

Example 4

The compound $V_2(O_2CCH_3)_4$ was prepared as described by dispersing 1.82 grams of vanadium pentoxide in 10 grams of pure water, dissolving 3.08 grams of ammonium acetate and 4.48 grams of concentrated hydrochloric acid. This liquid was gently purged with nitrogen gas to displace dissolved oxygen and 6.5 grams of zinc dust was added in portions during a 5 minute period. The dispersion changed to a colored solution as the catalyst formed.

Cellulose material conversions were conducted in concentrated sulfuric acid by heating cellulose materials in a sealed reactor with a small amount of catalyst to a temperature in the range of 240° C. to 290° C. The final temperature was maintained for approximately ten minutes before the reactor was allowed to cool to room temperature.

Example A

A 23 mL Teflon lined stainless steel reactor was sealed to heat 0.0685 g of news paper plus 0.0113 g of cobaltic sulfate dispersed in 5.52 g of concentrated sulfuric acid to 260° C. for approximately ten minutes. The cooled reactor was opened to expose an oily brown liquid with no solid residue. An aliquot of the liquid was totally soluble in water and produced no suspension or residue. A preliminary nitrochromic acid test liquid turned blue proving the presence of an alcohol.

Example B

A 23 mL Teflon lined stainless steel reactor was sealed to heat 0.1086 g of news paper plus 0.0062 g of cobaltic sulfate dispersed in 5.515 g of concentrated sulfuric acid to 260° C. for approximately ten minutes. The cooled reactor was opened to expose an oily brown liquid with no solid residue but a slight brown micro-suspension in water. An aliquot of the liquid was soluble in water and produced no suspension or residue.

Example C

A 23 mL Teflon lined stainless steel reactor was sealed to heat 0.0683 g of switch grass plus 0.0143 g of cobaltic sulfate dispersed in 5.52 g of concentrated sulfuric acid to 260° C. for approximately ten minutes. The cooled reactor was opened to expose an oily brown liquid with a few micro dirt particles. An aliquot of the liquid was totally soluble in water and produced no suspension or residue.

Example D

A 23 mL Teflon lined stainless steel reactor was sealed to heat approximately 0.0540 g of bagasse plus approximately 0.0080 g of cobaltic sulfate dispersed in 5.525 g of concentrated sulfuric acid to 260° C. for approximately ten minutes. The cooled reactor was opened to expose an oily brown liquid with no solid residue. An aliquot of the liquid was totally soluble in water and produced no suspension or residue.

Example E

A 250 mL three neck round bottom flask, fit with a thermocouple, a condenser and a vapor vent tube, was supplied with 0.101 gram of cobaltic sulfate catalyst and 10.0 grams of news paper dispersed in 100.0 grams of concentrated sulfuric acid. The flask was heated by a thermally controlled heating mantle to 260° C. to 292° C. for a period of three hours during which time several grams of clear distillate were recovered. The distillate was neutralized with sodium carbonate and tested positive (blue color) for the presence of alcohol using a nitrochromic acid test.

What is claimed is:

1. Catalytic chemical conversion of acid digested cellulose materials comprising newspaper, wood sawdust, prairie grass, switch grass, bagasse, cotton, waste cellulose products and starch materials directly to ethanol without fermentation.

2. Catalytic chemical conversion of acid digested cellulose materials comprising newspaper, wood sawdust, prairie grass, switch grass, bagasse, cotton, waste cellulose products and starch materials directly to ethanol without fermentation at 200° C. to 350° C.

3. Catalytic chemical conversion of acid digested cellulose materials comprising newspaper, wood sawdust, prairie grass, switch grass, bagasse, cotton, waste cellulose products and starch materials directly to ethanol without fermentation at 200° C. to 350° C. in a sealed reactor at digestion vapor pressure with conversion efficiencies of some 90 percent.

4. Catalytic chemical conversion of acid digested cellulose materials comprising newspaper, wood sawdust, prairie grass, switch grass, bagasse, cotton, waste cellulose products and starch materials directly to ethanol without fermentation at 200° C. to 350° C. in a sealed reactor at digestion vapor pressure with conversion efficiencies of some 90 percent wherein catalysts, possessing a degree of symmetry, are formed from transition metal compounds comprising titanium, vanadium, chromium, manganese, iron, cobalt, nickel, copper, zirconium, niobium, molybdenum, ruthenium, rhodium, palladium, silver, hafnium, tantalum, tungsten, rhenium, osmium, iridium, platinum, gold or combinations thereof.

5. Catalytic chemical conversion of cellulose materials comprising newspaper, wood sawdust, prairie grass, switch grass, bagasse, cotton, waste cellulose products and starch digested in concentrated sulfuric acid at 200° C. to 350° C. in a sealed reactor directly to ethanol without fermentation with conversion efficiencies comprising 90 percent.

6. Catalytic chemical conversion of cellulose materials comprising newspaper, wood sawdust, prairie grass, switch grass, bagasse, cotton, waste cellulose products and starch digested in concentrated sulfuric acid at 200° C. to 350° C. in a sealed reactor directly to ethanol without fermentation with conversion efficiencies comprising 90 percent wherein catalysts, possessing a degree of symmetry, are transition metal salts of cobalt.

7. Catalytic chemical conversion of cellulose materials comprising newspaper, wood sawdust, prairie grass, switch grass, bagasse, cotton, waste cellulose products and starch digested in concentrated sulfuric acid at 200° C. to 350° C. in a sealed reactor directly to ethanol without fermentation with conversion efficiencies comprising 90 percent wherein catalysts, possessing a degree of symmetry, comprise transition metal salts of titanium, vanadium, chromium, manganese, iron, cobalt, nickel, copper, zirconium, niobium, molybdenum, ruthenium, rhodium, palladium, silver, hafnium, tantalum, tungsten, rhenium, osmium, iridium, platinum or gold, or combinations thereof.

* * * * *